Oct. 3, 1950
E. RAYMOND ET AL
2,524,600
APPARATUS FOR DETERMINING THE SPECIFIC GRAVITY OF FLUIDS
Filed Oct. 27, 1944
2 Sheets-Sheet 1
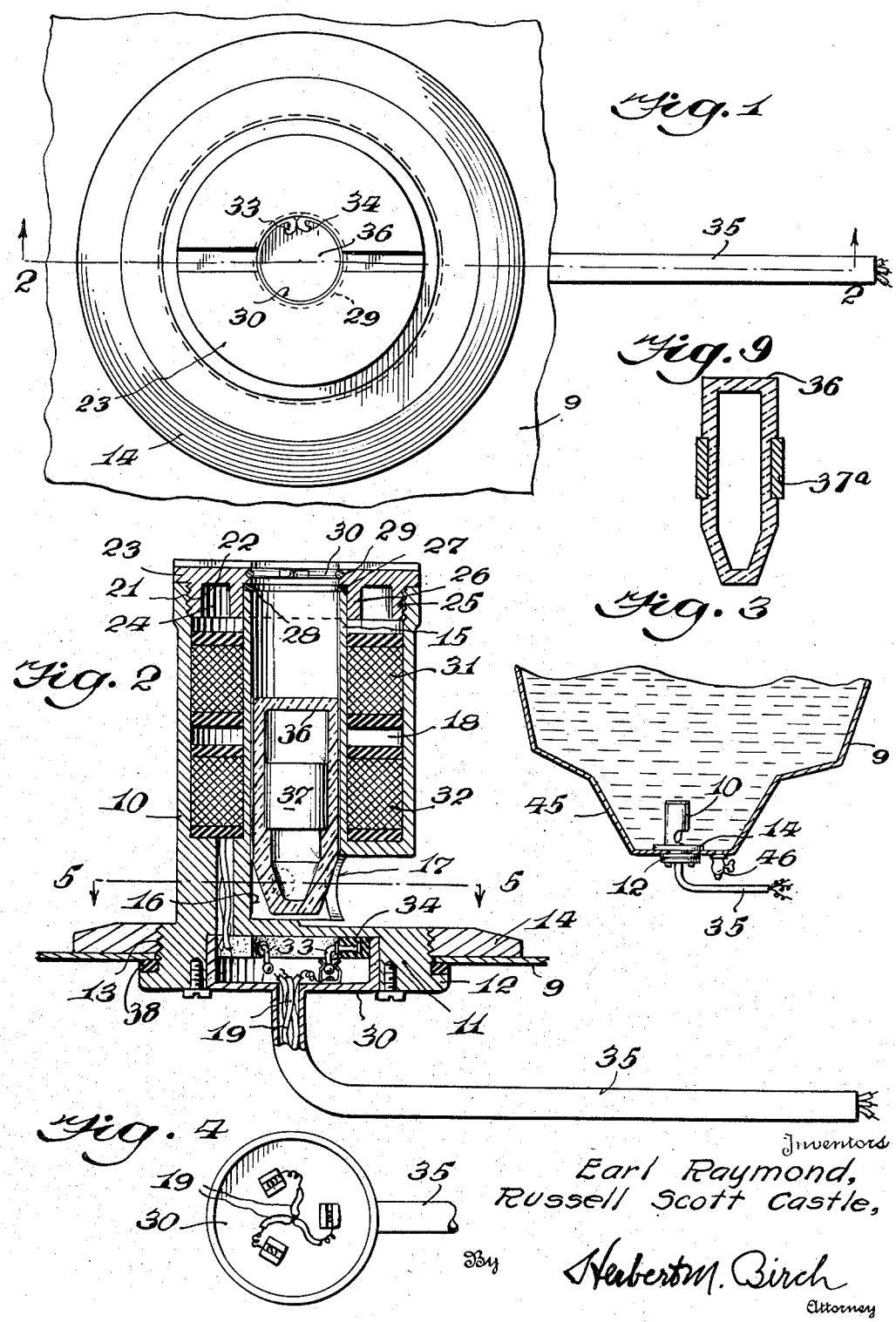
Inventors
Earl Raymond,
Russell Scott Castle,
By Herbert M. Birch
Attorney Oct. 3, 1950

E. RAYMOND ET AL
APPARATUS FOR DETERMINING THE
SPECIFIC GRAVITY OF FLUIDS 2,524,600

Filed Oct. 27, 1944

Inventors
Earl Raymond,
Russell Scott Castle,

By Herbert M. Birch
Attorney

Patented Oct. 3, 1950

2,524,600

UNITED STATES PATENT OFFICE 2,524,600

APPARATUS FOR DETERMINING THE SPECIFIC GRAVITY OF FLUIDS

Earl Raymond, Alexandria, and Russell Scott Castle, Woodbridge, Va.

Application October 27, 1944, Serial No. 560,600

5 Claims. (Cl. 73—33)

The present invention relates generally to electrical indicating systems and particularly to a novel means adapted to indicate the presence of fluid varying in specific gravity from the fluid normally contained in a fuel tank or the like.

Heretofore, it has been necessary, for example, to drain approximately three or more gallons of fuel from the fuel tank of an aircraft following each flight, and prior to taking off on a new flight, due to the accumulation of water in the tank caused by condensation or other causes. Water accumulation from condensation is particularly rapid and more frequent in aircraft because of the frequent changes in temperature of the ambient atmosphere through which the craft is piloted with respect to the interior of the fuel tank.

Accordingly, it is an object of the present invention to provide novel indicating means, whereby any moisture content within a tank may be readily determined.

Another object of the invention is to provide a novel electrical indicating system, whereby a remotely positioned indicator means is adapted to indicate the purity of a fluid being used.

Another object is to provide a novel electrical indicator and housing therefor, wherein a float loaded for a specific gravity of a fluid to be used is adapted to be actuated by an undesirable fluid varying in specific gravity from the desirable fluid being used.

A further object of the invention is to provide in combination with a novel fuel tank or the like, a novel electrical indicating system responsive to the specific gravity of the fluid or fluids contained in the fuel tank.

Yet a further object is to provide in combination a novel electrical unit adapted to be attached to the bottom of a fuel tank or the like, a novel electrical indicating system responsive to the specific gravity of the fluid or fluids contained in the fuel tank.

A further object is to provide a novel indicator unit including a novel weighted float adapted to differentiate between the specific gravities of liquids in a tank.

Yet a further object is to provide in combination a novel electrical unit adapted to be attached to the bottom of a fuel tank or the like, including a float weighted according to the specific gravity of a fuel being used, and a Wheatstone bridge circuit adapted to be materially unbalanced when a fluid of greater specific gravity than the fuel is present in the fuel tank.

Another object of the invention is to provide for sealing off all fluid from all the electrical parts of the system to thereby prevent any corrosion thereof and/or short circuits of the electrical parts within the gauge unit.

Another object is to design a novel readily installed electrical gauge unit having a casing the greater part thereof which is made of one piece, and wherein efficiency, simplicity, economy, safety and durability are combined in one system.

The above and other objects and advantages of the present invention will appear more fully hereinafter from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views:

Figure 1 is a top plan view of the novel gauge unit.

Figure 2 is a longitudinal cross sectional view of the novel gauge unit along the line 2—2 showing the housing, the float and the inductance coils for each leg of a bridge circuit.

Figure 3 is a cross sectional view of a tank partly broken away with the novel gauge unit installed in a sump portion of the tank.

Figure 4 is an interior plan view of the electrical coupling plug and quick detachable connections attached to the electrical leads in the system.

Fig. 9 is a vertical section view of a modification of the float having a magnetic ring thereon.

Figure 5:
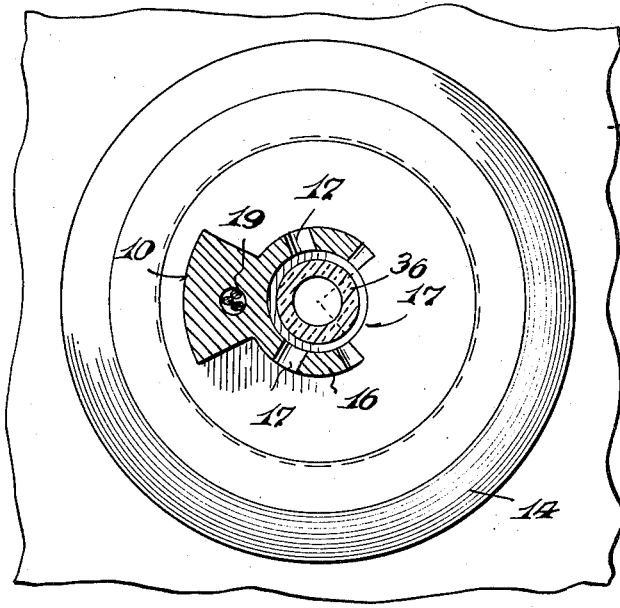
Figure 5 is a cross section view of the gauge unit taken along line 5—5 of Figure 2.

Referring specifically by numerals to designate like parts throughout the several figures of the drawings, which illustrate an embodiment of the present invention, and first with particular reference to Figure 2, the novel gauge unit comprises a novel body construction 10 having a relatively larger base 11. The body 10 may be cast, forged, or milled from one piece of material, such as metal, plastic or the like, so as to define a hollow cylinder within which is integrally formed a concentrically positioned relatively smaller hollow cylinder or tube 15, which cylinder 15 extends from the base 11 longitudinally to the top of the body 10.

The base 11 includes a head or flanged end 12 and is provided with screw threads 13 above head 12 on which is adapted to thread a coupling ring 14 for cooperatively attaching the body 10 to the bottom of a fuel tank 9 or the like, as shown in Figures 2 and 3.

The cylinder 15 is partially exposed as a separate entity from the body 10 adjacent the base 11, so as to define a relatively small semi-annular area 16 provided with apertures 17 as shown in Figure 5. The cylinder 15, hereinafter called the float chamber, thus permits the entry of fluid through the perforations 17 to thereby actuate a float, to be hereinafter described, confined within the float chamber 15. Because of the relatively smaller outer circumference of the float chamber 15 with respect to the inner walls of the body 10, there is thus defined an annular chamber 18 between the outer and inner walls of the float chamber 15 and body 10, respectively.

Figure 7:
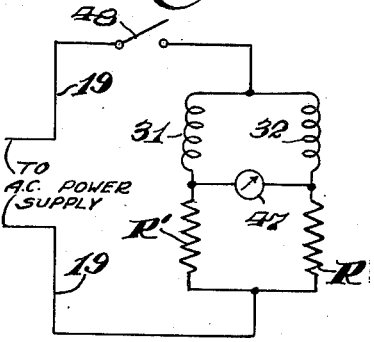
Figure 7 is a diagram of a simple bridge circuit, such as may be used in connection with the novel gauge and indicator unit.
Figure 6:
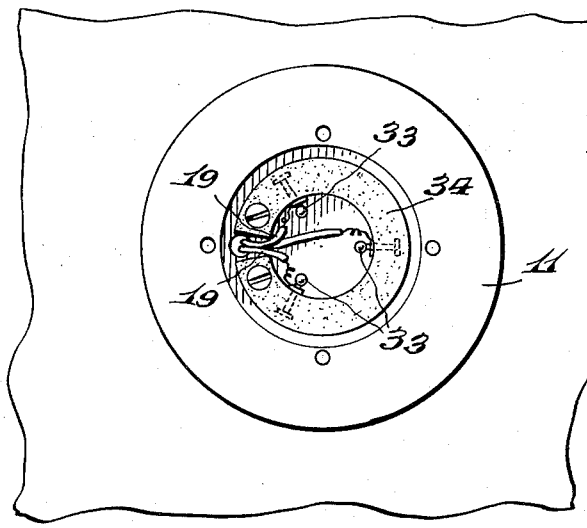
Figure 6 is a bottom view partly in elevation and cross section of Figure 2 with the electrical coupling plug removed.

In the annular chamber 18 are mounted a pair of superposed inductance coils, such as 31 and 32, shown in Figures 2 and 7. These coils 31 and 32 are mounted in the annular chamber 18 around the outside of the float chamber 15 and spaced apart a predetermined distance to provide for the proper cooperation with a float confined in the float chamber 15. The coils 31 and 32 are connected by leads 19 to a suitable source of power, such, for example, as a source of alternating current, not shown, derived from the power circuit of an aircraft. Each inductance coil 31 and 32 is arranged so as to be in opposite branches of an alternating current Wheatstone bridge, one of the coils having a higher inductance than the other, so that resistances R and R' in opposite branches of the bridge circuit, shown in Figure 7, do not alone provide a balanced circuit, it being essential that the iron core member 37 be totally within the field of the bottom coil 32 in order to balance the bridge circuit.

To facilitate a quick connection to the rest of the bridge circuit there may be provided as shown in Figures 2 and 4, a quick-detachable coupling plug 30 adapted to engage over jacks 33 carried by a conductor ring 34. Leading from the plug 30 there is a tubular conduit 35 for housing leads 19 that connect the coils with the rest of the circuit.

The upper inner perimeter of the body 10 is provided with screw threads 21 to cooperate with complementary threads 22 on the outer perimeter of a centrally apertured screw cap 23.

The screw cap 23 is so formed as to define an annular groove 24, between two depending flange rings 25 and 26 with flange 26 concentrically positioned within ring 25.

The inner flange ring 26 is bored out centrally slightly larger than the outer bore of the float chamber 15 to an annular shoulder 27 on which is seated a gasket ring 28 of one of the synthetic rubber like substances or other suitable material. Thus when the cap 23 is threaded into the top of body 10, the ring 26 slides over the top of the float chamber 15 and as the cap is tightened the upper rim of chamber 15 seats against the gasket 28 and provides a fluid-tight seal for the annular chamber 18 between the outer and inner walls of the float chamber 15 and body 10 respectively.

The annular shoulder 27 defines the central aperture of the screw cap 23 and provides for a relatively thin annular surface from the top of the cap in which surface is defined an annular groove 29. In the groove 29 is mounted a snap ring 30 with ears 33 and 34 which extend over the aperture defined in the cap 23 so as to serve as stops for a float 36 adapted to reciprocate within the float chamber 15 as hereinafter described.

The float 36 is designed and weighted in a manner such as to differentiate between the specific gravities of the involved fluids, for example, gasoline and water, by movement within the confines of the spaced superposed coils 31 and 32 around the float chamber 15.

A weighted member 37a such as a ring of iron or the like as shown in Fig. 9, may be mounted on the float 36 or cast within it as shown in Fig. 2. The float is made of plastic, and is made of a length equal to that of coils 31 and 32, so that the lower extremity of the iron ring member 37a will fall directly in line with the lower extremity of the bottom coil 32 when the float 36 is held in quiescent suspension by pure gasoline or other fuel in the tank. With the float 36 and its weight 37 in a position of rest entirely within the lower coil 32 and an air gap only in the upper coil 31, the bridge circuit, shown in Figure 7 is arranged to be balanced, that is, coils 32 and 31 are wound, such that the inductance of coil 32, plus the iron member 37 is equal to the inductance of the coil 31 with no iron member 37 therein. This is accomplished by providing coil 31 with a greater number of turns than coil 32. Thus when the float 36 proceeds in an upward direction, it moves the iron member 37 from the direct field of the bottom coil 32, which varies its inductance, at the same time passing into the field of the upper coil 31. This unbalances the bridge circuit in the opposite direction, i. e., the inductance of the top coil 31 increases. Such arrangement increases the sensitivity of the bridge indication with regards to a given movement of the float due to the fact that the most minute displacement of weight 36 varies the field of the coil 32.

The tank 9 may be of particular novel construction, such as shown in Figure 3, wherein the bottom contains a sump portion 45 into which the main walls of the tank converge. This arrangement directs the heavier fluid of the tank into sump 45. On the bottom of the sump is mounted the body 10 of the unit, as shown in Figure 2, wherein the coupling ring 14 threads on the base 11 and pulls head 12 tight against a gasket 38 to thereby seal the bottom wall of the tank against leakage around the base 11. Leading from the sump is a petcock 46 for draining off water or the like from the tank 9 when the indicator 47, which may be mounted on the instrument panel board of an aircraft or other mobile object, shown in Figure 8, indicates the presence of water in the tank 9.

The circuit is normally balanced when the iron core 37 is within the confines of lower coil 32. When the switch 43 is closed the bridge is energized, and the indicator 47 may be set, so as to give a normal reading to indicate pure gasoline, for example, until moisture accumulates in the sump 45, and raises the float to materially unbalance the circuit and move the indicator 47. The indicator 47 may be any suitable type, such as a galvanometer or the like.

Figure 8:
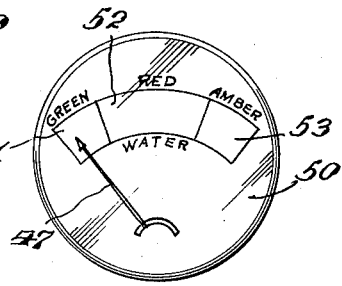
Figure 8 is a front view of one form of indicator scale adapted for use with the present invention.

The scale 50, shown in Figure 8, of the indicating instrument 47 is marked off so that it may be used for trouble shooting when faulty operation of the aircraft engine occurs or as previously stated prior to each take off for a new flight. Thus with voltage applied to the bridge circuit and the float 36 in the extreme down position of its path of travel, but just above the base 11, due to the intensity of the fuel, a slight indication is obtained on the green section of the scale 50, which will show that only liquid is present having a specific gravity to which the weight 37 on the float has been adjusted. Also, this reading indicates that voltage is being supplied to the bridge. When a liquid then enters the float chamber 15 having a heavier specific gravity, the float 36 will rise upward from lower coil 32 to upper coil 31. This unbalances the bridge circuit and causes the indicator to change its reading to the water indicating part of the scale 50, which may be colored red. The amount of deflection in the indicator pointer 47 is dependent upon the amount of movement of the float and the amount of liquid entered having a higher specific gravity than the fuel.

The float movement is adjusted so that regardless of the amount of foreign fluid in the tank above a given amount it never produces more than three-fourths scale deflection; so that from one extremity of the first division 51 of the scale marked green, to a point three-fourths on the scale, marked in red, would indicate the presence of the fluid with the heavier specific gravity. The last section 53 of the scale, colored amber, may be arranged to show the indicating circuit is out of adjustment or defective, as in the event of total failure of a component part of the bridge, which then would produce a full scale reading to the extreme right.

Thus there is provided a simple electrical means for determining the presence of undesirable fluids in tanks and a system which is easy to maintain in accurate adjustment.

The present system is also constructed so as to be light in weight, durable, easy to install in any tank structure, and particularly adapted for mass production.

While the several features of our invention have been illustrated and described in considerable detail as an embodiment of substantially only one form of the novel device, other changes and modifications, which will now appear to those skilled in the art, may be made without departing from the scope of the present invention.

Reference is therefore to be had to the appended claims for a definition of the limits of the present invention.

What we claim is:

1. In an impedance bridge circuit adapted to be energized by a source of current through suitable switch means, including an indicator adapted to be mounted on the instrument panel board of a mobile object, a specific gravity gauge unit for use in fuel tanks having a low point in the bottom thereof, said unit comprising a sealed housing, a central chamber open to the fluid contents of the fuel tank in the bottom of which said unit is installed, a pair of inductance coil members differently wound mounted around the walls of said central chamber in said sealed housing connected to opposite legs of said bridge circuit, an elongated buoyant member having a magnetic portion thereof in said central chamber adjusted to be held in quiescent suspension by fuel in said tank within the confines of one of said coils, said other coil being so wound with respect to said first coil as to balance said bridge circuit when the magnetic portion of said buoyant member is in the magnetic field of said first coil, and means across the top of said central chamber adapted to limit the extent of movement of said buoyant member to the confines of said second coil when said member is raised by a heavier fluid than fuel, so as to bring the said magnetic portion directly into the magnetic field of said second coil to thereby unbalance the said bridge circuit in the opposite direction and thereby actuate said indicator on the instrument panel board to indicate the presence of such heavier fluid in the fuel tank.

2. For use in a fuel tank having a sump portion in the bottom thereof, a gauge unit adjusted to the specific gravity of fuel to be used in said tank, comprising a sealed housing having an unsealed base portion mounted in the said sump, a float chamber open at each end extending longitudinally of said housing to said unsealed base portion, a pair of inductance coils mounted in said sealed housing one above the other adjacent the wall of said float chamber, a float in said chamber, an iron slug carried by said float, an impedance bridge circuit having each opposite branch thereof connected to one of said coils, said upper coil being wound so that the inductance thereof is equal to the inductance of the lower coil with the said iron slug in its flux path when said circuit is energized and said float is suspended by fuel.

3. Means for determining the presence of a fluid in a tank or the like by the relative specific gravity thereof with respect to a relatively less dense fluid fuel, comprising a housing having the greater portion thereof sealed, a float chamber open at each end centrally disposed within said housing, a pair of differently wound inductance coils, one of which coils is connected as a part of one branch of two adjacent branches of a suitable bridge circuit, and the other coil being a part of the other adjacent branch of the bridge circuit, said coils being aligned concentrically around said float chamber within said sealed portion of said housing, a perforated portion below said sealed portion of the housing adjacent the lower end of said float chamber, a float in said chamber weighted to thereby remain submerged in fuel and to float in a relatively denser fluid, a magnetic member on said float adapted to align at its lower peripheral edge with each lower peripheral edge of either of said coils to balance and unbalance the said circuit according to the density of the fluids present in said float chamber, and means adapted to limit the travel of said float within the confines of said coils.

4. In a Wheatstone bridge circuit including means for indicating a voltage drop in either branch thereof, a gauge unit adapted to be mounted in a fuel tank, said tank having a sump portion in the bottom thereof, said gauge unit comprising a housing sealed from the contents of the fuel tank, a float chamber open to the contents of the fuel tank, a pair of superimposed coils having relatively different values of inductance, one of said coils being in one branch and the other of said coils being in another adjacent branch of said circuit, said coils being in said housing mounted around the outside of said float chamber, a float in said chamber adapted to float in the presence of a fluid heavier than liquid fuel, and magnetic means on said float adapted to vary the inductance relations of the coils to thereby balance said bridge circuit when the magnetic means is disposed within one of said coils, when fuel only is present in the sump portion of the tank, and to unbalance said circuit when said magnetic means is carried by said float into the field of said other coil, to thereby indicate the presence of a heavier fluid than fuel in the tank.

5. In a bridge circuit a gauge adapted to measure the specific gravity of fluids comprising a unitary hollow body portion including a solid base and an interior hollow cylinder of relatively smaller size within said hollow body defined from the material of said body, a pair of electrical inductance coils having different inductance values mounted around said hollow cylinder in the said body, the lower of said coils being in one branch of the bridge circuit and the upper of said coils being in the adjacent branch of said bridge circuit, apertures formed in said cylinder adjacent said base adapted to admit fluid within said cylinder, a float including a weight of magnetic material in said cylinder adapted to balance the bridge circuit when said float is in the field of the lower coil and to unbalance the bridge circuit when said float is in the field of said upper coil according to the density of the fluids in said cylinder, said float thereby being balanced to float on the denser fluid and to submerge in the less dense fluids, closure means adapted to seal-off the said inductance members from the fluid in said hollow cylinder, means mounted in said closure means adapted to limit the movement of said float and coupling means carried by said base portion adapted to couple said gauge to the bottom of a fuel tank or the like.

EARL RAYMOND.
RUSSELL SCOTT CASTLE.

REFERENCES CITED

The following references are of record in the file of this patent:

UNITED STATES PATENTS

| Number | Name | Date |
|---|---|---|
| 1,145,879 | Belcher | July 13, 1915 |
| 1,344,663 | Waldrep | June 29, 1920 |
| 1,491,487 | Means | Apr. 22, 1924 |
| 1,743,852 | Harrison | Jan. 14, 1930 |
| 1,972,220 | Edelmann | Sept. 4, 1934 |
| 2,025,774 | Rennick et al. | Dec. 31, 1935 |
| 2,045,970 | Stein | June 30, 1936 |
| 2,050,629 | Quereau et al. | Aug. 11, 1936 |
| 2,084,548 | Bennett | June 22, 1937 |
| 2,160,210 | Cannetta et al. | May 30, 1939 |
| 2,208,621 | Ball et al. | July 23, 1940 |
| 2,260,516 | Gerber | Oct. 28, 1941 |
| 2,273,850 | Ewald | Feb. 24, 1942 |
| 2,362,661 | Peters et al. | Nov. 14, 1944 |
| 2,357,745 | Kliever | Sept. 5, 1944 |

FOREIGN PATENTS

| Number | Country | Date |
|---|---|---|
| 308,939 | Germany | Nov. 5, 1918 |
| 329,631 | Italy | Sept. 17, 1935 |